(12) United States Patent  (10) Patent No.: US 6,697,641 B1
Shapira  (45) Date of Patent: Feb. 24, 2004

(54) METHOD AND SYSTEM FOR IMPROVING COMMUNICATION

(75) Inventor: Joseph Shapira, Haifa (IL)

(73) Assignee: Celletra Ltd., Yokneam Ilit (IL)

( * ) Notice: Subject to any disclaimer, the term of this patent is extended or adjusted under 35 U.S.C. 154(b) by 0 days.

(21) Appl. No.: 09/171,986

(22) PCT Filed: Mar. 3, 1998

(86) PCT No.: PCT/IL98/00104

§ 371 (c)(1),
(2), (4) Date: Dec. 30, 1998

(87) PCT Pub. No.: WO98/39856

PCT Pub. Date: Sep. 11, 1998

(30) Foreign Application Priority Data

| Mar. 3, 1997 | (IL) | 120364 |
| Apr. 20, 1997 | (IL) | 120706 |
| Jun. 30, 1997 | (IL) | 121201 |

(51) Int. Cl.$^7$ .................. H04M 1/00; H04B 7/10
(52) U.S. Cl. ............... 455/562.1; 455/561; 342/361
(58) Field of Search .................. 455/277.1, 277.2, 455/278.1, 279.1, 562, 561, 522.1; 342/372, 373, 361, 367, 368, 359; 343/700

(56) References Cited

U.S. PATENT DOCUMENTS

| 3,436,691 A | | 4/1969 | Hoffman et al. | |
| 3,491,314 A | | 1/1970 | White | |
| 4,647,880 A | | 3/1987 | Argaman | |
| 4,933,680 A | * | 6/1990 | Shapiro et al. | 343/700 |
| 5,017,927 A | | 5/1991 | Agrawal et al. | |
| 5,223,848 A | * | 6/1993 | Rammos et al. | 343/700 |
| 5,280,472 A | | 1/1994 | Gilhousen et al. | |
| 5,347,535 A | * | 9/1994 | Karasawa et al. | 375/1 |
| 5,455,537 A | | 10/1995 | Larkin et al. | |
| 5,485,120 A | | 1/1996 | Anvari | |
| 5,489,875 A | | 2/1996 | Cavers | |
| 5,499,395 A | | 3/1996 | Doi et al. | |
| 5,513,176 A | | 4/1996 | Dean et al. | |
| 5,533,011 A | | 7/1996 | Dean et al. | |
| 5,563,610 A | | 10/1996 | Reudink | |
| 5,565,873 A | | 10/1996 | Dean | |

(List continued on next page.)

FOREIGN PATENT DOCUMENTS

| EP | 722 227 | 7/1996 |
| WO | 96/00991 | 1/1996 |

OTHER PUBLICATIONS

Johnson, Richard C., Antenna Engineering Handbook, section 26–28, thir edition, 1993 McGraw Hill, Inc.*
Jorn Toftgard and Patrick C. F. Eggers; Experimental Characterization of the Polarization State Dynamics of Personal Communication Radio Channels, Proc. IEEE VTC'93, pp. 65–69.
U.S. patent application Ser. No. 09/357,845, Shapira.
U.S. patent application Ser. No. 09/389,053, Shapira.
U.S. patent application Ser. No. 09/357,844, Shapira et al.

*Primary Examiner*—William Trost
*Assistant Examiner*—Meless Zewdu
(74) *Attorney, Agent, or Firm*—G.E. Ehrlich (1995) Ltd.

(57) ABSTRACT

Method and device for enhancing performance of a base station (112) transceiver by detecting signal received from a mobile transceiver (140) by at least two antennas (H, V), thereby producing a plurality of received signal portions, determining the polarization of a signal transmitted to the mobile transceiver (140) according to the detected polarization characteristics, providing the reassembling the received signal from the received signal portions according to the detected polarization characteristics and alternatively dithering the polarization of the transmitted signal.

4 Claims, 14 Drawing Sheets

U.S. PATENT DOCUMENTS

| | | |
|---|---|---|
| 5,576,659 A | 11/1996 | Kenington et al. |
| 5,579,016 A | 11/1996 | Wolcott et al. |
| 5,584,049 A | 12/1996 | Weaver, Jr. et al. |
| 5,588,020 A | 12/1996 | Schilling |
| 5,592,471 A | 1/1997 | Briskman |
| 5,596,329 A | 1/1997 | Searl et al. |
| 5,602,555 A | 2/1997 | Searle et al. |
| 5,602,834 A | 2/1997 | Dean et al. |
| 5,612,703 A | 3/1997 | Mallinckrodt |
| 5,642,353 A | 6/1997 | Roy et al. |
| 5,649,293 A | 7/1997 | Reed |
| 5,666,123 A | 9/1997 | Chrystie |
| 5,675,629 A | 10/1997 | Raffel et al. |
| 5,697,053 A | 12/1997 | Hanly |
| 5,703,874 A | 12/1997 | Schilling |
| 5,714,957 A | 2/1998 | Searle et al. |
| 5,715,516 A | 2/1998 | Howard et al. |
| 5,721,757 A | 2/1998 | Banhet |
| 5,757,318 A * | 5/1998 | Reudink ..................... 342/374 |
| 5,758,090 A | 5/1998 | Doner |
| 5,777,579 A | 7/1998 | Goetz et al. |
| 5,784,031 A | 7/1998 | Weiss et al. |
| 5,798,675 A | 8/1998 | Drach |
| 5,815,116 A | 9/1998 | Dunbridge et al. |
| 5,841,395 A | 11/1998 | Simone |
| 5,848,358 A | 12/1998 | Forssen et al. |
| 5,856,810 A | 1/1999 | Lopez |
| 5,861,844 A | 1/1999 | Gilmore et al. |
| 5,872,548 A | 2/1999 | Lopez |
| 5,889,494 A | 3/1999 | Reudink et al. |
| 5,907,304 A | 5/1999 | Wilson et al. |
| 5,918,154 A * | 6/1999 | Beasley ..................... 455/11.1 |
| 5,963,874 A * | 10/1999 | Mahler ....................... 455/562 |
| 6,067,053 A * | 5/2000 | Runyon et al. ............. 343/797 |

* cited by examiner

METHOD AND SYSTEM FOR IMPROVING COMMUNICATION

This application is the national phase under 35 U.S.C. §371 of prior PCT International Application No. PCT/IL98/00104 which has an International filing date of Mar. 3, 1998 which designated the United States of America, the entire contents of which are hereby incorporated by reference.

FIELD OF THE INVENTION

The present invention relates to wireless communication in general and to a method and a transmission system for improving performance, capacity and coverage in particular.

BACKGROUND OF THE INVENTION

Wireless communication is known in the art. A conventional wireless transmitter produces an electromagnetic signal, which is transmitted over a medium. This medium is often non-perfect, being rural or urban, and induces reflections and other disturbances, which cause the signal to fade. This phenomena is called multi-path.

Cellular mobile communication attempts to provide mobility, multi-user capacity (many independent users access the system), coverage (service is offered over a large contiguous area) and grade and quality of service.

Cellular communications are generally limited by local codes to a range of frequencies. A widely used technique of cellular communications employs spatial isolation in order to be able to reuse the same frequencies beyond a given range called a guard zone. The communications of each user is maintained with a base station, whose antenna is elevated above the scenery in order to achieve a well defined and controlled coverage area. Sectorization is achieved by directive antennas that illuminate only one sector, thereby reducing interference, enhancing performance and reducing a pattern of frequency reuse.

The number of concurrent calls communicating with Each sector of cellular communications is limited by the frequency band assigned to the service, by the technology used and by the frequency reuse pattern. The number of calls per unit area, also called area capacity, can be increased by reducing the cell size. Small cells that are positioned below roof tops in urban areas are called microcells. These use lower and smaller antennas. The cell hardware is more compact, and in some cases has less circuits. Another technique for microcells involves the antenna and RF circuitry only, remote from the cell equipment and connected via RF, fiber or microwave link, to the cell. Such an arrangement is especially attractive for operators in possession of RF or fiber trunking, like CATV companies.

Electromagnetic radiation is polarized and allows for two orthogonal polarization states. It will be appreciated by those skilled in the art that an antenna can only transmit in a single polarization state.

The propagation of the signals through an inhomogeneous medium and through scattering may transfer part of the signal to the orthogonal polarization. This is the case for terrestrial communications, for example, and in particular in urban areas, where the signals encounter multipaths from objects on the way.

The transfer of polarization has been found to be typically −10 dB in rural areas, −7.8 dB in urban areas and as high as −4 dB indoors [See for example Jorn Toftgard and Patrick C. F. Eggers: Experimental Characterization of the Polarization State Dynamics of Personal Communication Radio Channels, Proc. IEEE VTC'93, pp.65–69].

The orthogonal polarization components have been found to have an independent fading pattern, with correlation lower than 0.6 and similar fading statistics.

Diversity techniques are used in wireless communications to mitigate the degradation due to signal fading. In space diversity, the antennas for space diversity are spaced apart enough for the fading of the waves arriving to each to be time-independent from those arriving at the other. The spacing required between the antennas is inversely proportional to the angle of intercept of the arriving waves. Accordingly, often the distance between such two antennas is chosen to be considerably large.

A repeater in the cellular system is a device that receives the transmission from the Base Station (the donor side) and retransmits it to the subscribers(the distribution side) with proper amplification. Simultaneously it receives the signals from the subscribers and retransmits it, with proper amplification, to the Base Station. Repeaters are used mainly for the following applications:

Providing RF coverage in areas where the signal received from the Base Station is too week ("Radio Holes")

Extending the cell coverage, e.g. along highways

Extending the coverage into tunnels, buildings or other structures.

A repeater has to be transparent—the grade of service should not be degraded by the introduction of the repeater in the link. The repeater has to cover the frequency range allocated to the distribution area to be covered. Preferably it is the whole frequency range of the Base Station. The repeater has to have alarms, status reporting and controls, to be controlled from the Base Station, either via land lines or via transmissions. The lack of diversity in the repeaters hampers their performance.

SUMMARY OF THE PRESENT INVENTION

It is an object of the present invention to provide a system for enhancing the coverage of wireless transmission, which overcomes the disadvantages of the prior art.

It is another object of the present invention to provide a novel method for controlling the polarization of a transmitted signal, thereby overcoming the disadvantages of the prior art.

In accordance with a preferred embodiment of the present invention, there is thus provided a modular cellular wireless communication base station, which includes a plurality of active radiator modules located at a desired antenna location, wherein each module includes at least one antenna for transmitting and receiving, a transmitter including a power amplifier, and a receiver.

The base station further includes a beam forming network controlling relative amplitudes and phases of each of the modules, an RF front end transmitting over a low power link with the active radiator modules via the beam forming network and receiving over a lower power link via a low noise amplifier.

The base station further includes a delay diversity module that provides a transmission CDMA delay diversity.

According to one aspect of the invention, the delay diversity module includes a SAW delay line and an amplifier that compensates for a delay line insertion loss.

According to another aspect of the invention, the delay diversity module is connected at a transmission beam forming network input.

According to a further aspect of the invention, the delay diversity module is connected at an active antenna transmission input.

A polarization diversity and matching system for cellular radio, including:

a dual polarized antenna pair at a base station, each antenna including an appropriate receive channel; and a signal combining and control circuitry that adds polarization diversity to a base station receiver.

Preferably, the circuitry is characterized by two time constants, wherein a fast circuit adapts to fading signals on a received reverse link and changes weights of two antennas, and a slow circuit follows physical movements of a mobile station and averages fading of a received signal.

The slow circuit is driven by information from received signals and matches transmitted signal polarization to that of an incoming signal.

The slow circuit can also detect an average polarization vector direction from received signals and produces an output matched signal from the received signals according to the average polarization vector direction.

Signal portions from two receiving antennas are weighed by weights controlled by the signal combining and control circuitry, the weights being fed into a transform circuit that transforms the weights according to polarizations of the transmitting antennas and differences in gain.

The system can further include a low-pass filter that averages fast control variations and responds only to slow variations resulting from a physical attitude change of the station.

Preferably, a transmit chain is split into two branches, and weights are applied to each branch for each receive channel.

Alternatively, a transmit chain is split into two branches that operate at a fixed power. Accordingly, the phase of one of the branches is switched between 0°, +90°, +180°, −90°, and −180°.

In accordance with a further preferred embodiment of the invention, there is thus provided a method for increasing transmission gain to a mobile station of a mobile communications system. The method includes the steps of:

substantially simultaneously transmitting from two transmit antennas so as to form a radiation pattern that is characterized by a plurality of radiation lobes. Each lobe is characterized by a width inversely proportional to a distance between the antennas. The amplitude of the lobes is bound by the radiation pattern of the antennas, determining a transmission direction to a mobile station, and aiming the pattern so as to produce a maximum in the transmission direction, thereby increasing transmission gain to the mobile station, and reducing scattering into the mobile station from foreign objects.

The step of determining a transmission direction can include amplifying and filtering a signal from each antenna, splitting the signals, and changing a phase of the signals relative to one another so as to determine the direction.

The step of determining a transmission direction can include extracting direction information from a receive diversity control for a given antenna channel and correcting for a difference in frequency.

In accordance with another aspect of the present invention there is thus provided an apparatus for increasing transmission gain to a mobile station of a mobile communications system. The apparatus includes two transmit antennas positioned together with a pair of diversity receive antennas, and an aiming apparatus.

The two transmit antennas transmit substantially simultaneously so as to form a radiation pattern that is characterized by a plurality of radiation lobes. Each lobe is characterized by a width inversely proportional to a distance between the transmit antennas. The amplitude of the lobes is bound by the radiation pattern of the transmit antennas.

The aiming apparatus aims the pattern so as to produce a maximum in a transmission direction to a mobile station, thereby increasing transmission gain to the mobile station, and reducing scattering into the mobile station from foreign objects.

The transmit antennas and the receive antennas can include a plurality of active radiator module arrays.

Furthermore, the transmit antennas are preferably spaced by a distance as required to avoid correlation between fading of signals from remote mobile stations within a coverage area.

In accordance with a further aspect of the present invention there is thus provided a system for improving coverage of a wireless transceiver. The system includes a means for transmitting an outgoing is signal in two orthogonal polarized states; and means for controlling the polarization of at least one of the states, thereby polarizing the outgoing signal at any desired direction.

The transmitting means can include a plurality of antennas, wherein at least one of the antennas transmits a portion of the outgoing signal in a predetermined polarization vector, and at least another one of the antennas transmits a portion of the outgoing signal in a polarization vector which is orthogonal to the predetermined polarization vector.

The controlling means constantly change the polarization direction of the outgoing signal.

In accordance with another aspect of the present invention there is thus provided a method for improving coverage of a wireless transmitter including the steps of:

receiving an outgoing signal, constantly changing the direction of the polarization vector of the outgoing signal, according to a polarization change pattern, and transmitting the polarized outgoing signal.

The method can further include the step of determining the polarization change pattern.

The polarization change pattern can be determined from the characteristics of the wireless transmitter, or from the characteristics of the area covered by the wireless transmitter, or from both.

The method can further include the step of determining the characteristics of the area.

Accordingly, the polarization change pattern is selected from the list consisting of a linear polarization change pattern, a cyclic polarization change pattern, a non-linear polarization change pattern, a random polarization change pattern, and the like.

In accordance with another aspect of the present invention there is thus provided a repeating device including a donor antenna for linking to a transmitting antenna of a base station, two orthogonally polarized donor antennas, for linking to two orthogonally polarized receive antennas of the base station, a subscriber-side antenna, for linking to at least one mobile transceiver and two orthogonally polarized subscriber-side antennas, for linking to the at least one mobile transceiver.

The device further includes an amplifier, connected between the donor antenna and the subscriber-side antenna, for amplifying a signal received by the donor antenna prior to transmitting the signal via the subscriber-side antenna, another amplifier, connected between one of the orthogonally polarized donor antenna and one of the orthogonally polarized subscriber-side antenna, for amplifying a signal received by the one orthogonally polarized subscriber-side antenna prior to transmitting the signal via the one orthogonally polarized donor antenna and a further amplifier, connected between the other of the orthogonally polarized donor antenna and the other of the orthogonally polarized subscriber-side antenna, for amplifying a signal received by the other orthogonally polarized subscriber-side antenna prior to transmitting the signal via the other orthogonally polarized donor antenna.

In accordance with a further aspect of the present invention there is thus provided a repeating device including two orthogonally polarized donor transmit antennas, for linking to two orthogonally polarized receive antennas of a base station, two orthogonally polarized donor receive antennas, for linking to two orthogonally polarized transmit antennas of the base station, two orthogonally polarized subscriber-side transmit antennas, for linking to at least one mobile transceiver and two orthogonally polarized subscriber-side receive antennas, for linking to the at least one mobile transceiver.

The device further includes an amplifier, connected between one of the orthogonally polarized donor transmit antenna and one of the orthogonally polarized subscriber-side receive antennas, for amplifying a signal received by the one orthogonally polarized subscriber-side receive antenna prior to transmitting the signal via the orthogonally polarized donor transmit antenna.

The device also includes another amplifier, connected between the other of the orthogonally polarized donor transmit antennas and the other of the orthogonally polarized subscriber-side receive antennas, for amplifying a signal received by the other orthogonally polarized subscriber-side receive antenna prior to transmitting the signal via the other orthogonally polarized donor transmit antenna.

The device further includes an amplifier, connected between one of the orthogonally polarized donor receive antenna and one of the orthogonally polarized subscriber-side transmit antennas, for amplifying a signal received by the one orthogonally polarized donor receive antenna prior to transmitting the signal via the orthogonally polarized subscriber-side transmit antenna.

The device also includes an amplifier, connected between the other of the orthogonally polarized donor receive antenna and the other of the orthogonally polarized subscriber-side transmit antennas, for amplifying a signal received by the other orthogonally polarized donor receive antenna prior to transmitting the signal via the other orthogonally polarized subscriber-side transmit antenna.

In accordance with a further aspect of the present invention, there is thus provided a method for repeating a randomly polarized signal, including the steps of:

receiving the signal at first and second states, thereby providing a first portion of the signal, received at the first polarization state and a second portion of the signal, received at the second polarization state, and transmitting the first portion according to the first polarization state and the second portion according to the second polarization state.

This method can further include the step of amplifying the first and second portions, before the step of transmitting.

Preferably, the first polarization state is orthogonal to the second polarization state.

In accordance with another aspect of the present invention, there is provided a repeating device including a donor side transceiver section, a subscriber side transceiver section and amplification means connected therebetween.

The donor side includes a plurality of donor side transceiver elements, transmitting outgoing signals in a first non-correlated manner.

The subscriber side includes a plurality of subscriber side transceiver elements, receiving incoming signals in a second non-correlated manner.

According to one aspect of the invention at least one of the first non-correlated manner and the second non-correlated manner incorporates space diversity. According to one aspect of the invention at least one of the first non-correlated manner and the second non-correlated manner incorporates polarization diversity. Thus, any combination of such manner is applicable for the present invention.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
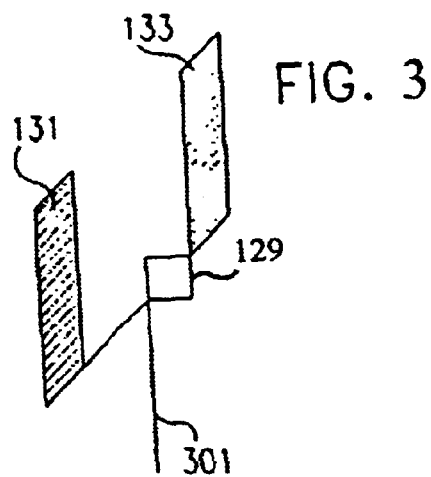
FIG. 3 illustrates a transmission diversity system in a forward link of a CDMA base station, constructed and operative in accordance with a preferred embodiment of the present invention.

Reference is now made to FIG. 3 which illustrates a transmission diversity system in a forward link of a CDMA base station, constructed and operative in accordance with a preferred embodiment of the present invention. The embodiment is for a base station built according to the Interim Standard IS 95, and related standards, but is not limited to these standards only. The transmission signal is preferably split to the number of antennas to be used for transmission, typically two antennas 131 and 133.

A delay that is longer than the CDMA chip. (a term known to those familiar with CDMA technology) is inserted in the transmit chain of each of the other antennas relative to the first antenna. This delay may be inserted in the RF chain, by a delay line 301 and a delay unit 129 (FIG. 3), (a term known to those familiar with FRF technology) or in the digital base band. With the IS 95, the required delay is higher than 1.5 microseconds. The signal is then transmitted by all antennas, each having about the same coverage. These signals are then received by the mobile station with different "fingers" and optimally combined, as with natural multipath signals (a process known to those familiar with CDMA technology). The diversity gain thus obtained may be significant.

The typical delay profile depends on the environment. In urban and suburban environments, the first delay cluster may extend to about 2 microseconds. An optimal delay is preferably selected for the transmission in order to minimize interference from natural multipaths arriving at the same time.

In accordance with another embodiment of the present invention, dual polarized active antennas are provided for BS of mobile communication systems. This dual polarized pair for transmit, and one for receive, allow the BS to use polarization diversity on receive, and polarization matching on transmit.

Diversity is a powerful way to mitigate the multipath in mobile communications systems. Most of the cellular systems in use today employ antenna diversity in the base station for receiving the reverse link-transmission from the mobile station (MS). However, the mobile stations do not include multiple antennas and diversity receivers for reasons of cost and complexity. Diversity in use by most is space diversity, whereby the two (or more) receive antennas are spaced apart in order to reduce the correlation between their fading.

The correlation between orthogonally polarized signals is also low, particularly for urban and indoors propagation, and polarization diversity is also an efficient mitigation means against channel fading. One very important advantage of polarization diversity is the compactness of the antenna arrangement involved.

Dual polarized antennas may also be used at the BS for polarization matching of the forward link (transmission from the BS to the MS), as described further hereinbelow. The use of modular active antennas in the BS is also described further hereinbelow.

Figure 4:
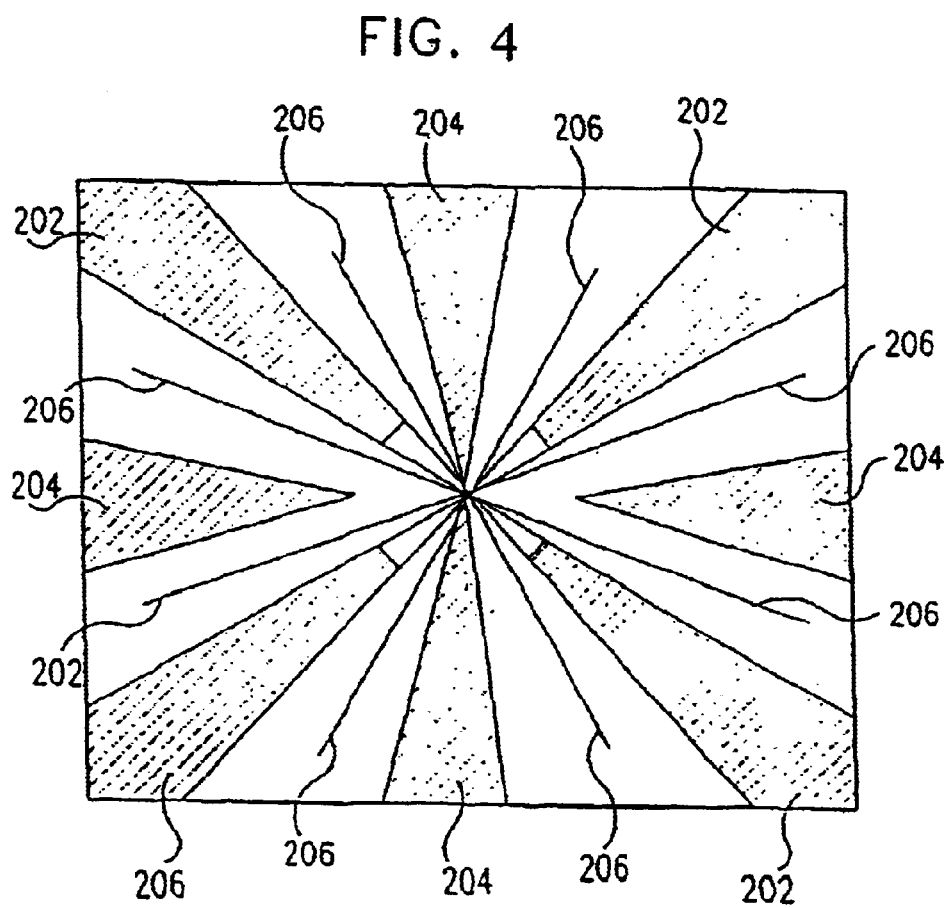
FIG. 4 illustrates a modular dual polarized base station antenna system, constructed and operative in accordance with a preferred embodiment of the present invention.

Reference is now made to FIG. 4 which illustrates a modular dual polarized base station antenna system, constructed and operative in accordance with a preferred embodiment of the present invention. The system preferably includes two pairs of orthogonal polarization antennas. The embodiment of FIG. 4 exhibits a compact arrangement, whereby one pair 202 is polarized at ±45° while another pair 204 is H-V (horizontal-vertical) polarized. This particular arrangement has a relatively high isolation between the transmit and receive pairs, and each pair may be tuned to its desired frequency range. Alternatively all pairs of antennas may be H-V polarized. Other arrangements are possible, e.g. patches.

The transmit antennas are typically polarized at ±45°. Alternatively they may be H-V polarized. In one embodiment, each antenna is fed by a separate amplifier. The transmit signal splitting and weights of each polarization are performed at the base station at a low RF level, or IF or at the baseband, thus avoiding RF losses. One other alternative is to apply the weights by control of the amplifiers gain. The use of two amplifiers allows for the summation of their transmit power in the air, for any polarization determined by the polarization matching circuit.

The receive antenna is typically polarized at H-V. In one embodiment, each antenna preferably feeds an LNA (Low Noise Amplifier). The weights to each signal are applied after amplification, at the BS, in RF, IF or baseband frequencies.

Each radiator module unit consists of two dual polarization antenna pairs, as exemplified in FIG. 4. Isolation structure, as shown by lines 206, are used in one embodiment for increasing the isolation between the antenna pairs.

The present invention overcomes the disadvantages of the prior art by providing a method and a system for increasing the coverage of a wireless transmitted signal, and the communication system performance and capacity, by controlling the polarization of a transmitted signal.

Cellular systems operate traditionally in vertical polarization. Most of the mobile terminals, mounted on vehicles, have vertically polarized antennas. The polarization of the hand-held terminals is variable, however, and depends on the particular terminal, its orientation versus the head of the user and the Base Station. There is an a-priori mismatch of the polarization between the hand-held terminal and the BS antenna.

The forward (from the base station) and the reverse (from the Mobile station) transmissions differ in frequency and thus, do not have correlated fading.

Diversity schemes, used for mitigating the fading, are therefore applicable on receive only, due to lack of information to control transmission so as to reach the other receiver without fade. Only the base stations are equipped with more than one antenna for receiving the signal from each mobile station, in most of the present day systems. The mobile stations that are equipped with one antenna only are unable to use antenna diversity for receive.

The polarization matching system described herein varies the polarization of the signal transmitted from the Base Station so as to match the short-term average polarization of the mobile stations.

Figure 1:
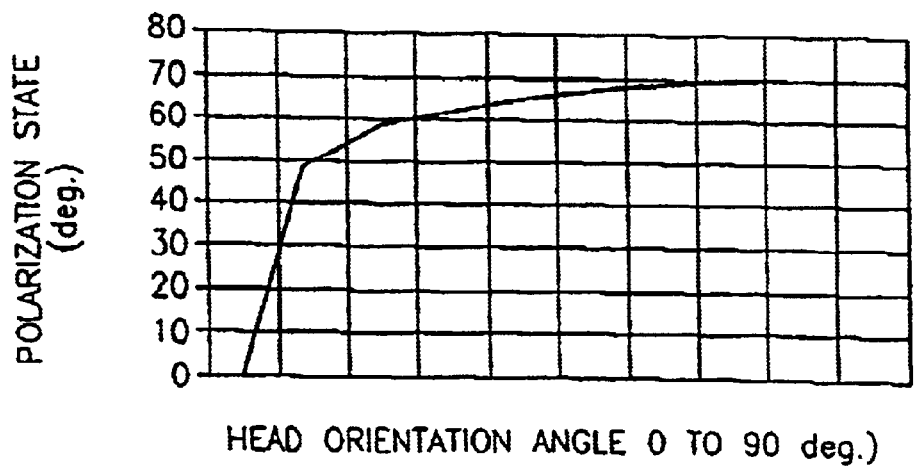
FIG. 1 is a schematic illustration of the state of polarization versus the orientation of the head relative to the direction of propagation.

Reference is now made to FIG. 1 which is a schematic illustration of the state of polarization versus the orientation of the head orientation toward the direction of propagation.

A Cross Polarization Discrimination (XPD) of −7.8 dB is translated into an average polarization span of less than 22.2° around the transmitted polarization, and high eccentricity of the polarization ellipse.

Matching the receive antenna to linear polarization along the major axis of this ellipse results in less than 0.67 dB loss. The receive antennas are preferably matched to two slant linear polarizations relative to the transmit polarization in order for the signal to be received with an equal average SNR by both and for the polarization diversity to be effective.

The polarization of a signal transmitted from a handheld terminal, depends on the angular direction of the head relative to the Base Station (or to the direction of the main propagation path toward the base station).

The signal is generally polarized 20° above the horizon for sideways direction, but vertically polarized when the head is aligned with the direction of propagation.

The power loss due to polarization mismatch relates to $COS^2$(angle between polarization of the receive antenna and that of the incoming wave).

Figure 2:
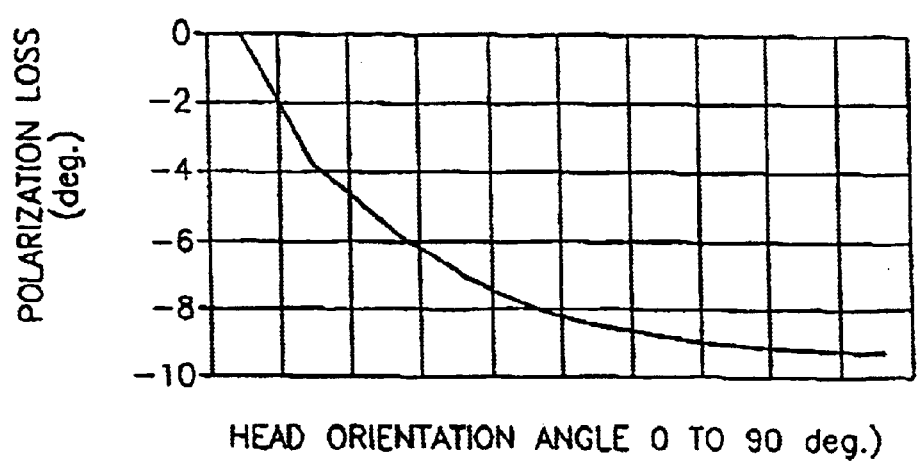
FIG. 2 is a schematic illustration of the state of polarization loss versus the orientation of the head, with the base station antenna vertically polarized.

Reference is now made to FIG. 2, which is a schematic illustration of the state of polarization loss versus the orientation of the head orientation, with the BS antenna vertically polarized.

The loss reaches over 9 dB for extreme positions. An average loss, assuming a uniform angular distribution of the head positions, is 7 dB (dB average) or 6.5 dB (linear average). This average loss is incorporated into the handset antenna gain and taken into account in the link budget. Much of that loss can be recovered, however, if proper polarization matching takes place.

Figure 5:
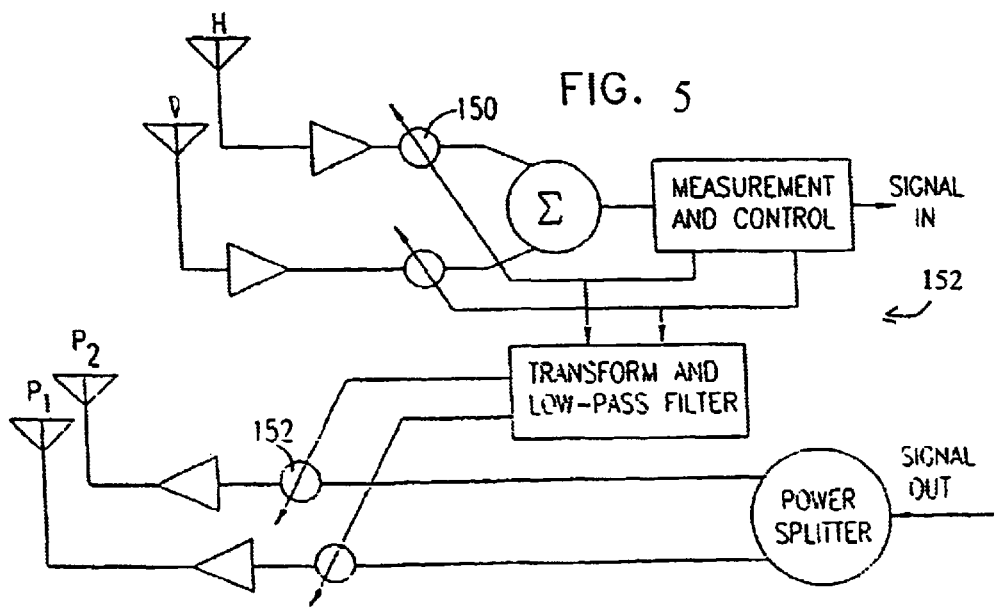
FIG. 5 illustrates a polarization diversity and matching system for cellular radio, generally referenced 152, constructed and operative in accordance with a preferred embodiment of the present invention.

Reference is now made to FIG. 5 which illustrates a polarization diversity and matching system for cellular radio, constructed and operative in accordance with a preferred embodiment of the present invention.

A dual polarized antenna pair at a base station, with an appropriate receive channel for each, and a signal combining and control circuitry, adds polarization diversity to a base station receiver, by itself or in addition to other diversities. In the present invention the adaptive combining control circuit has two time constants. First, a fast circuit adapts to fading signals on a received reverse link and changes weights of two receive antennas. Second, a slow circuit follows only the physical movements of the MS, but averages fading of the received signal. This control is applied to a dual polarization transmission antenna pair, with their appropriate transmission channels. This slow control, driven by the information from the received signals, matches the transmitted signal polarization to that of the incoming signal. This enhances the forward link significantly in situations of large polarization mismatch, that may be frequent in normal operation.

The signal from the two receiving antennas are weighed by weights 150, controlled by the measurement and control circuit. This can be applied in RF, IF or at the baseband. These weights are also fed into a transform circuit, that transforms the weights according to the different polarization of the transmitting antennas (e.g. tilted linear, or circular) and differences in gain. The low-pass filter averages the fast control variations and responds only to the slow variations resulting from the physical attitude changes of the MS. Weights 152 may be applied to the transmitted signal at the base band, at the IF, prior to power amplification, as shown, or after amplification, or applied to the amplifiers gain control. The same antennas may also be used for both reception and transmission. In such a case the signals are separated by a diplexer.

In accordance with another embodiment of the present invention, a method and apparatus are provided whereby a mobile communications system can enhance the transmitted signal to each mobile station(MS) while reducing the multipath fading, and the interference to other MS.

Transmission in a terrestrial environment encounters multipaths due to scattering from various objects. The multipath components, arriving at the receiver, interfere with each other to form typical fading of the signal, when either transmitter, receiver or scattering obstacles are in motion. This is one of the most detrimental effects on the communications in this service. Diversities are employed to mitigate the fading, whereby propagation routes which have an independent fading (non-correlated fading) are received separately and then combined in a way that reduces the variations in the signal. Base stations in the cellular service typically employ two receive antennas, spaced apart so as to have no correlated reception from the mobile stations in their coverage area. Diversity on the forward link (transmission from the BS) is not implemented in most systems because of the excess complexity needed in the MS by introducing two antennas and the accompanying circuitry. In transmission diversity from the BS, two or more transmit antennas are positioned far apart to avoid correlation, and their transmitted signals are controlled in amplitude and phase in correspondence to the output of the adaptive control circuitry of the receiving antennas. Such an arrangement does not apply to the cellular systems where the forward and the reverse links transmission have different frequencies, far enough to decorrelate the fading between the two links.

Narrow beam transmission from the BS has been proposed, in order to increase the signal strength received by the MS, and reduce the interference to other MS. Narrow beam transmission also reduces the multipath interference to the BS by limiting the illuminated area around the BS. Such a narrow beam has to track the desired MS direction. Algorithms proposed for this task make use of the direction information obtained from the diversity antennas. A BS that communicates with many mobile stations needs to form simultaneously many narrow beams so as to optimize the transmission to each station. Such an arrangement requires a multibeam antenna array which is a relatively complex system.

Figure 15:
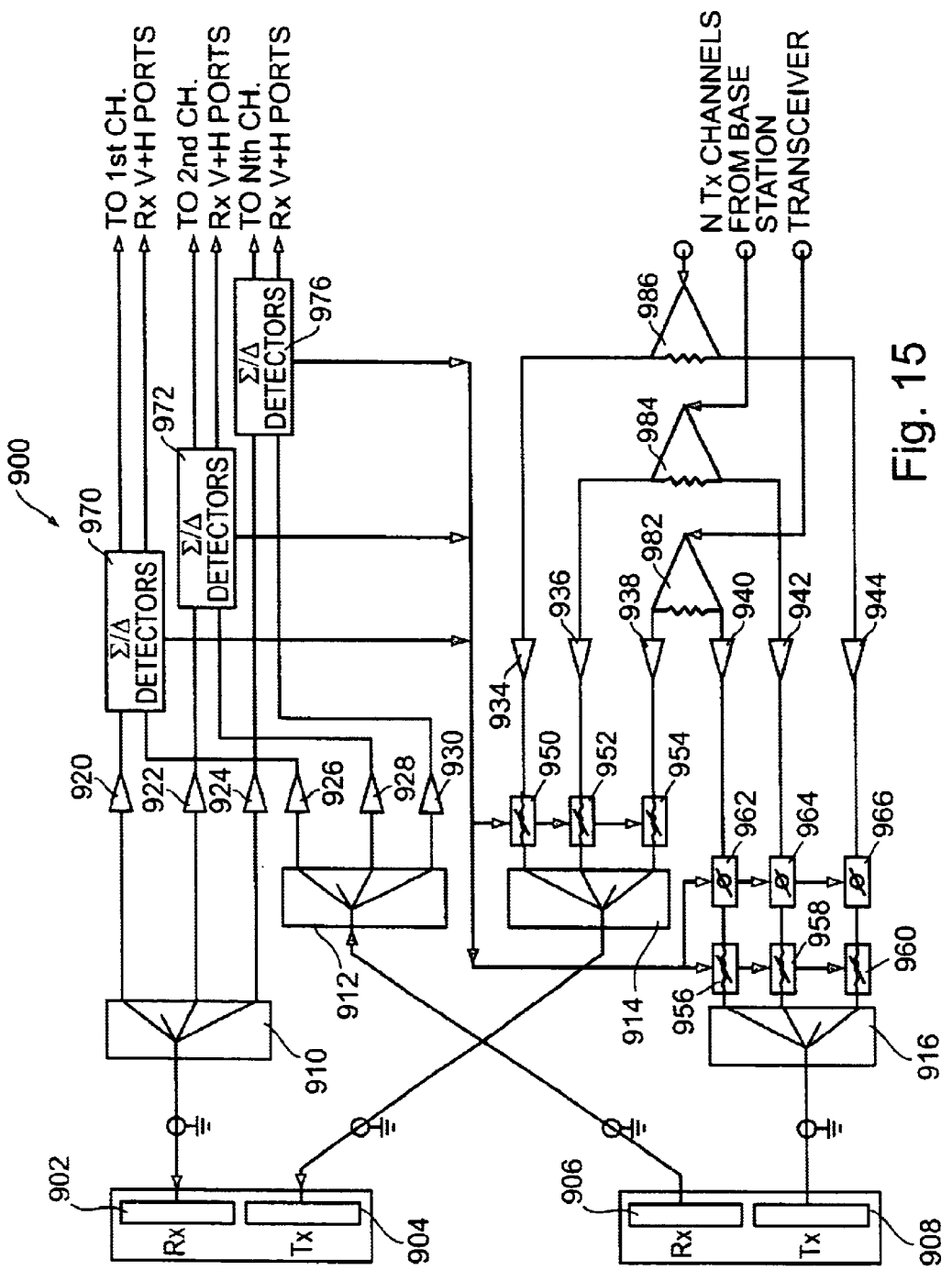
FIG. 15 is a schematic illustration of a polarization matching transceiver, constructed and operative in accordance with another preferred embodiment of the present invention.

Reference is now made to FIG. 15, which is a schematic illustration of a polarization matching transceiver, generally referenced 900, constructed and operative in accordance with another preferred embodiment of the present invention.

Transceiver 900 includes two receive antennas 902 and 906, two transmit antennas 904 and 908, two filtering units 910 and 912, connected to receive antennas 902 and 906, respectively, two combining units 914 and 916, connected to transmit antennas 904 and 908, respectively, a plurality of amplifiers 920, 922, 924, 926, 928, 930, 934, 936, 938, 940, 942 and 944, a plurality of diminishing units 950, 952, 954, 956, 958 and 960, a plurality of phase shift units 962, 964 and 966, a plurality of splitting units 982, 984 and 986 and a plurality of average polarization detection units 970, 972 and 976.

Amplifiers 920, 922 and 924 are connected to average polarization detection units 970, 972 and 976, respectively, as well as to the filtering unit 910. Amplifiers 926, 928 and 930 are connected to average polarization detection units 970, 972 and 976, respectively, as well as to the filtering unit 910.

Diminishing units or gain control units 950, 952 and 954 are lo connected to amplifiers 934, 936 and 938, respectively, as well as to the combining unit 914. Diminishing units or gain control units 956, 958 and 960 are connected to phase shift units 962, 964 and 966, respectively, as well as to the combining unit 916.

Amplifiers 934, 936 and 938 are respectively connected between diminishing units 950, 952 and 954 and splitting units 986, 984 and 982, respectively. Amplifiers 940, 942 and 944 are respectively connected between phase shift units 962, 964 and 966 and splitting units 982, 984 and 986, respectively.

The average polarization detection units 970, 972 and 976 are further connected to diminishing units 950, 952, 954, 956, 958 and 960, as well as to of phase shift units 962, 964 and 966.

The receive antennas 902 and 906 are orthogonally polarized. The transmit antennas 904 and 908 are orthogonally polarized.

Signals transmitted by a plurality of mobile stations are detected at the receive antennas 902 and 906, which provide them to the filtering unit 910 and 912, respectively. The filtering units separate the signal from each mobile station to a selected branch.

In the present example, a signal from a selected mobile station, detected by antenna 902, in a selected polarization, is provided by the filtering unit 910 to amplifier 920. The same signal, detected by antenna 906, in an orthogonal polarization, is provided by the filtering unit 912 to amplifier 926.

Amplifiers 920 and 926 provide their respective amplified signals to average polarization detection unit 970, which in turn detects the average polarization vector of the received signal. The average polarization detection unit 970 provides the direction of the detected average polarization vector to the transmit end of the transceiver (i.e., diminishing units or gain control units 950 and 960, as well as to phase shift unit 966). The output of unit 970 is also fed to the receiver +++, to be properly combined to maximize the output amplitude. This constitutes a simple polarization matching scheme for the receive channel.

A signal designated for the selected mobile station is provided by the cellular system via splitting unit 986, which in turn provides it to amplifiers 934 and 944. The amplifiers 934 and 944, each provide an amplified signal to diminishing unit 950 and phase shifting unit 966, respectively and from phase shifting unit 966 to diminishing unit 960.

Diminishing units or gain control units 950 and 960 control the portions of the outgoing signal to each of the orthogonal polarized transmitting antennas 90 and 908, and thus are able to determine the polarization of the transmitted signal. Phase shifting unit 966 controls the phase between the portion of the outgoing signal, provided to each of the transmitting antennas, and as such is also capable of determining the polarization of the transmitted signal.

Accordingly, these components provide a transmitted signal to a mobile station, having a polarization vector in the same direction as the polarization vector of the signal received from that mobile station.

Figure 6:
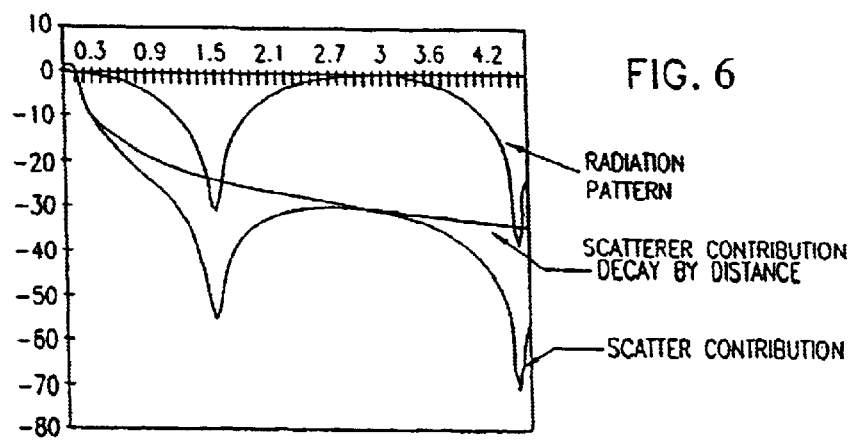
FIGS. 6, 7 and 8 illustrate transmission gain with two antennas in accordance with a preferred embodiment of the present invention.
Figure 7:
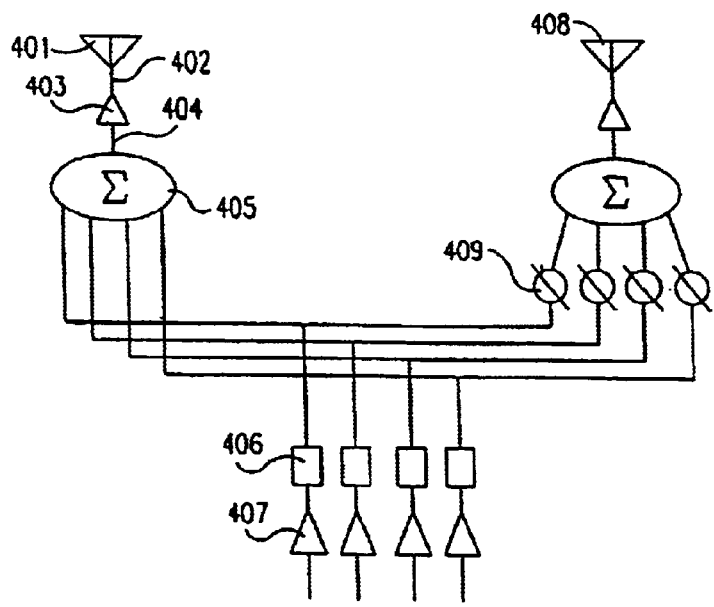
Figure 8:
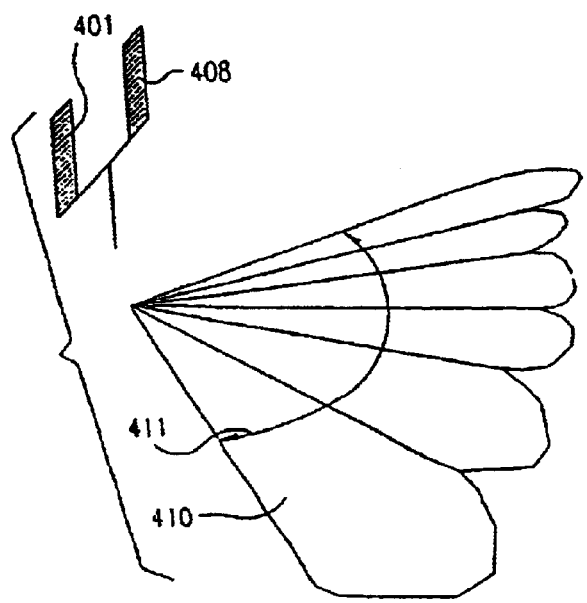

Reference is now made to FIGS. 6, 7 and 8 which illustrate transmission gain with two antennas in accordance with a preferred embodiment of the present invention.

Simultaneous transmission from two antennas forms a radiation pattern that is characterized by many radiation lobes, the width of each is inversely proportional to the distance (in wavelengths) between the antennas. The amplitude of these lobes is bound by the radiation pattern of the individual antennas. Such a pattern, when aimed in a way to produce a maximum in the direction of a mobile station; has a gain of 2 (3 dB) in that direction. The narrow lobe around this maximum also reduces the scattering into the mobile station from the objects in the area that is now illuminated less. The typical signals arriving at the mobile station from the scattering objects tend to diminish roughly in proportion to the second power of the distance of these scatterers from the mobile stations. Scatterers that are illuminated by the adjacent lobes contribute much less to the fading at the mobile stations. The contribution of the multilobe antenna to the mitigation of fading, when its radiation is properly aimed, is significant and comes close to that of a multibeam array whose size matches the distance between the antennas. This is illustrated in FIG. 6.

The interference to other mobistations is also reduced. Though some mobile stations, positioned at the peaks of other radiation lobes, receive the same signal strength as the desired mobile stations, other mobile stations within over 50% of the coverage area receive signals that are at least 3 dB lower, and over 10 dB lower within 20% of the area.

The application of such an arrangement is especially advantageous when the transmit antenna pair is positioned together with the diversity receive pair, on the same installation. A preferred embodiment is a pair of active radiator module arrays, each provided with receive and transmit antennas and amplifiers.

Reference is now particularly made to FIG. 7. The signal from each channel is amplified, filtered and then split to two active radiator modules. A phase control changes the relative phase of one active radiator module in respect to the other, to form the desired lobe direction. The information for directing the lobe may be achieved in different way. One preferred embodiment is by extracting direction information from the receive diversity control for that channel and correcting for the difference in frequency. Phase ambiguity is not important in this case, as it is with true direction finding, because the purpose is to point one of the lobes' peaks toward the MS and it is not important to determine which lobe. There are many estimation algorithms that can apply.

Referring to FIGS. 7 and 8, a pair of transmitting antennas 401 and 408 are preferably co-located with base station receiving antennas. Antennas 401 and 408 are preferably spaced by a distance as required to avoid correlation between fading of signals from remote mobile stations within the coverage area (411 in FIG. 8), typically 10 wavelengths. With reference to FIG. 7, a cable 402 is preferably provided to carry high power transmit signals (RF). A Multiple Carrier Linear Power Amplifier (MCLPA) 403 is preferably provided, as well as a cable 404 that carries low power transmit signals. In one preferred embodiment, MCLPA 403 is located at one of the antennas and connected thereto without a cable 402, thus avoiding additional losses. A passive combiner 405 preferably combines signals from the individual carriers, as is known in the art. A channel filter 406 and a single channel low power amplifier 407 (preamplifier), both well known in the art, are preferably provided for the transmitted signal. A signal control element 409 may be implemented in the RF, as shown in the figure, by a phase shifter, as is known in the art. In an alternative embodiment, signal control element 409 may be implemented in the IF or at the base band. The lobe of the coverage is referenced by numeral 410, and is created by the interference between the transmission signals of antenna 401 and 408.

Figure 9:
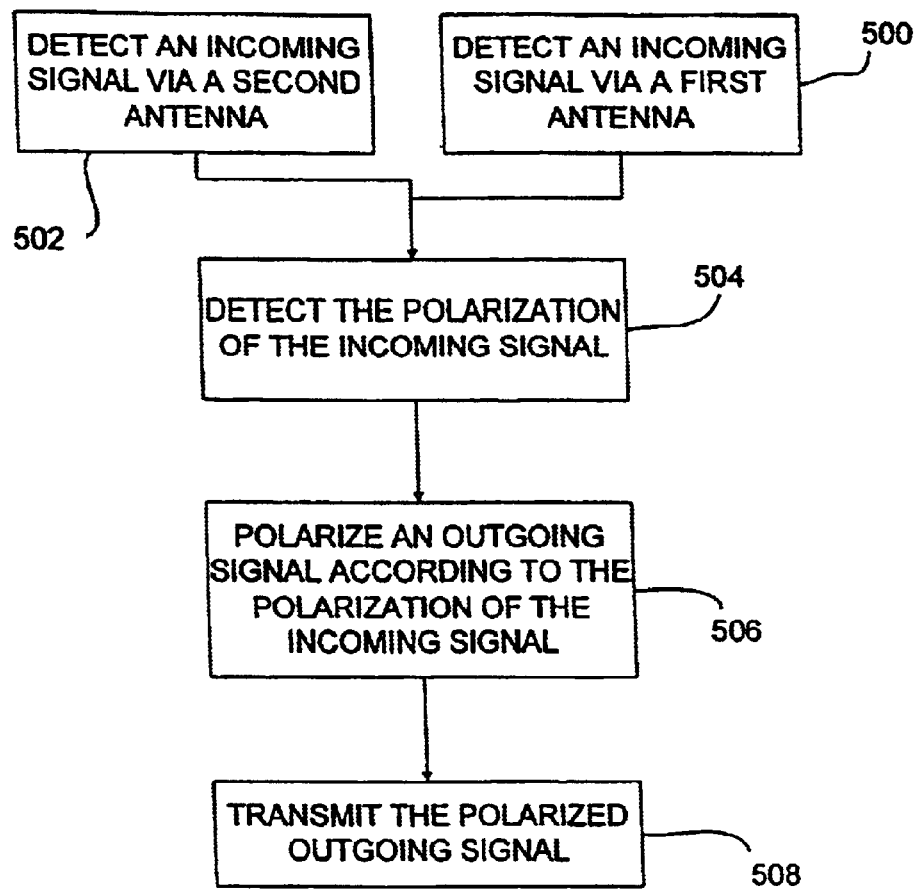
FIG. 9 is a schematic illustration of a method for operating the system of FIG. 5, operative in accordance with a further embodiment of the present invention.

Reference is now made to FIG. 9, which is a schematic illustration of a method for operating the system of FIG. 5, operative in accordance with a further embodiment of the present invention.

In step 500, the system detects an incoming signal via a first antenna, for example, a horizontal antenna.

In step 502, the system detects the same incoming signal via a second antenna, for example, a vertical antenna. It will be noted that the system can also detect this incoming signal via additional antennas, so as to increase accuracy of the measured features.

In step 504, the system detects the polarization of the incoming signal, using the portion detected by the first antenna and the portion, detected by the second antenna.

Finally, in step 508, the system transmits the polarized outgoing signal.

According to another aspect of the invention, there is provided a novel method and system which constantly change the polarization of a transmitted signal, thereby improving coverage and overcoming the disadvantages of the prior art.

Figure 10:
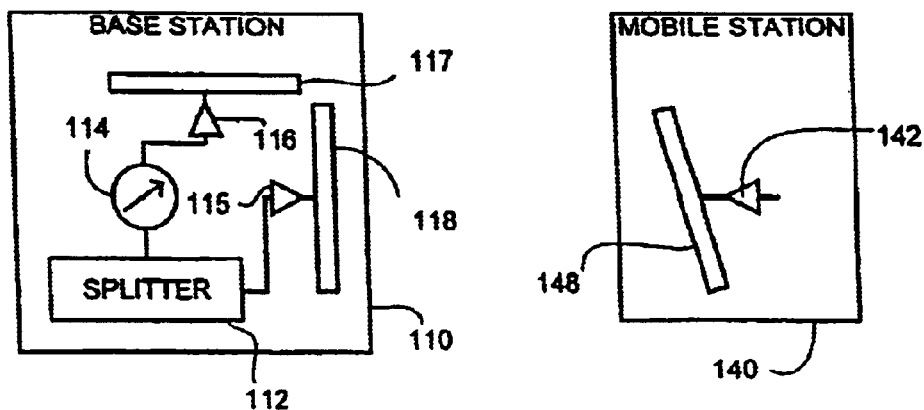
FIG. 10 is a schematic illustration of a communication system, constructed and operative in accordance with a preferred embodiment of the invention.

Reference is now made to FIG. 10, which is a schematic illustration of a communication system, generally referenced 100, constructed and operative in accordance with a preferred embodiment of the invention. System 100 includes a base station 110 and a mobile station 140.

Base station 110 includes a splitter 112, a phase shifter 114, two amplifiers 115 and 116, a horizontal antenna 117 and a vertical antenna 118. The controller is connected to the phase shifter 114 and to the amplifier 115, which is further connected to the vertical antenna 118. The amplifier 116 is connected to the phase shifter 114 and to the horizontal antenna 117.

Base station 110 is capable of transmitting a signal, which is polarized at any desired angle.

Mobile station 140 includes an amplifier 144 and an antenna 148, connected thereto and positioned neither vertically nor horizontally.

The splitter 112 provides a signal for transmitting, to the horizontal antenna 117 as well as to the vertical antenna 118.

The two antennas transmit this signal individually. The horizontal antenna 117 transmits the signal in one polarization state and the vertical antenna 118 transmits the signal in another polarization state. The two states are orthogonal to one another.

The combined signal from both antennas has a final single polarization, which is derived from a weighted combination of the two signals.

According to the present invention, the final polarization vector can be controlled by controlling each of the transmitted signal, either by amplitude, phase or both.

The phase shifter 114, controls the phase between the signals, by shifting the phase of the signal, provided to one antenna, with respect to the signal provided to the other antenna. In the present example, the phase shifter 114 controls the phase of the signal provided to the horizontal antenna 117.

The amplifiers 116 and 117, can provided variable amplification of the signal provided thereto. Accordingly, each of the antennas 117 and 118, can transmit at various power levels. In the present example, the splitter 112 controls the phase shifter 114 as well as the amplifiers 115 and 116, thereby controlling the polarization vector of the final signal.

Base station 110 can change the polarization vector in a discrete manner, a continuous manner and the like. In the present example, the base station 110 changes the polarization constantly. Preferably, the rate is determined to be much higher then the rate of fade caused by the speed of the mobile station 140. The relation between the radial speed of motion and the rate of fading is $$f_{fading} \le \left| \frac{2V}{\lambda} \right|$$

where V is the radial speed of the mobile station, and X is the wavelength of the transmitted signal.

The present invention mitigates the fading of slow moving mobile stations by introducing fast fading in the channel. Most digital wireless communications systems incorporate an interleaver in their digital modulation and coding. The interleaver scrambles the train of signal bits over a long time frame, so that when the signal fades temporarilly, the resulting errors are spread over the length of the interleaver frame, and do not impair complete code words. Interleavers are effective as long as their time frame is much longer than the duration of a fade, and therefore—for MS moving at high speeds.

This method is effective typically in areas where the polarization matching invention is not effective, namely: where the XPD (cross polarization discrimination) is less than about 4 dB. Such areas are typified also by a congestion of scattering objects, as in indoors, where the MS motion is also slow. According to the present example, the rate of change of the polarization is high enough for the interleaver in the system to be effective.

A fast variation of the polarization state of the transmission from the base station mitigates the fading by creating fast fading, that can be mitigated by the system interleaver. The fading rate is accelerated to match the range of parameters where the interleaver is effective. This is most effective for the slow motion and high depolarization typical of the indoors environment.

It will be appreciated that each base station can operate according to a polarization matching mode, as described above in conjunction with FIG. 5, as well as according to a polarization variation mode.

Figure 11:
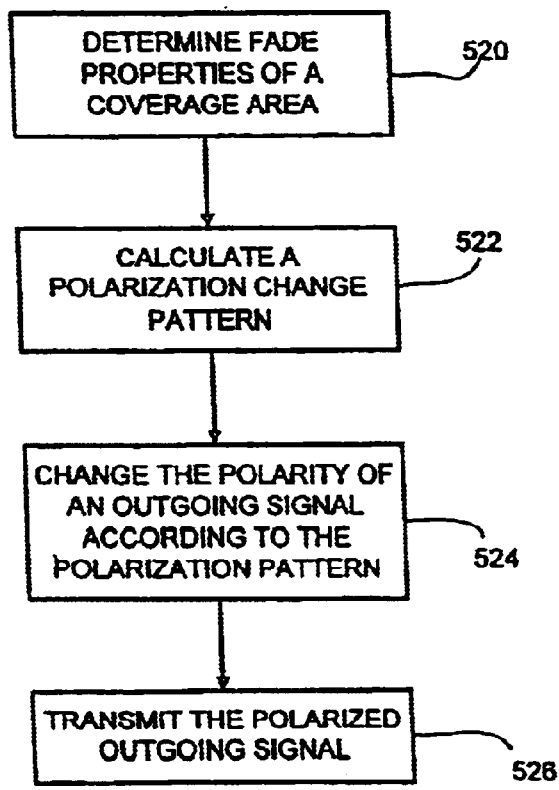
FIG. 11 is a schematic illustration of a method for operating a base station, operative in accordance with another preferred embodiment of the invention.

Reference is now made to FIG. 11, which is a schematic illustration of a method for operating base station 110, operative in accordance with another preferred embodiment of the present invention.

In step 520, the fade properties of the coverage area are determined.

In step 522, a polarization change pattern using the fade properties as well as the characteristics of the wireless system. This pattern can be any change pattern, linear, cyclic, non-linear, random, predetermined and the like. It will be noted that a general pattern can be determined regardless of the fade properties, provided that the change of polarization is rapid enough, with respect to the system characteristics.

In step 524, the base station changes the polarity of an outgoing signal, according to the polarization pattern and further transmits it (step 526).

In accordance with a further aspect of the invention there is provided a repeater which provides varying polarization.

The mobile propagation channel encounters multipaths by scattering from multiple objects along the propagation path. This channel undergoes fading as a result of the motion of the mobile terminal.

One efficient way to mitigate the fading is by providing an alternate channel whose fading are uncorrelated with those of the first one. Base stations are equipped for space or for polarization diversity on the reverse link. However, the lack of diversity hampers the performance of the repeater.

Figure 12:
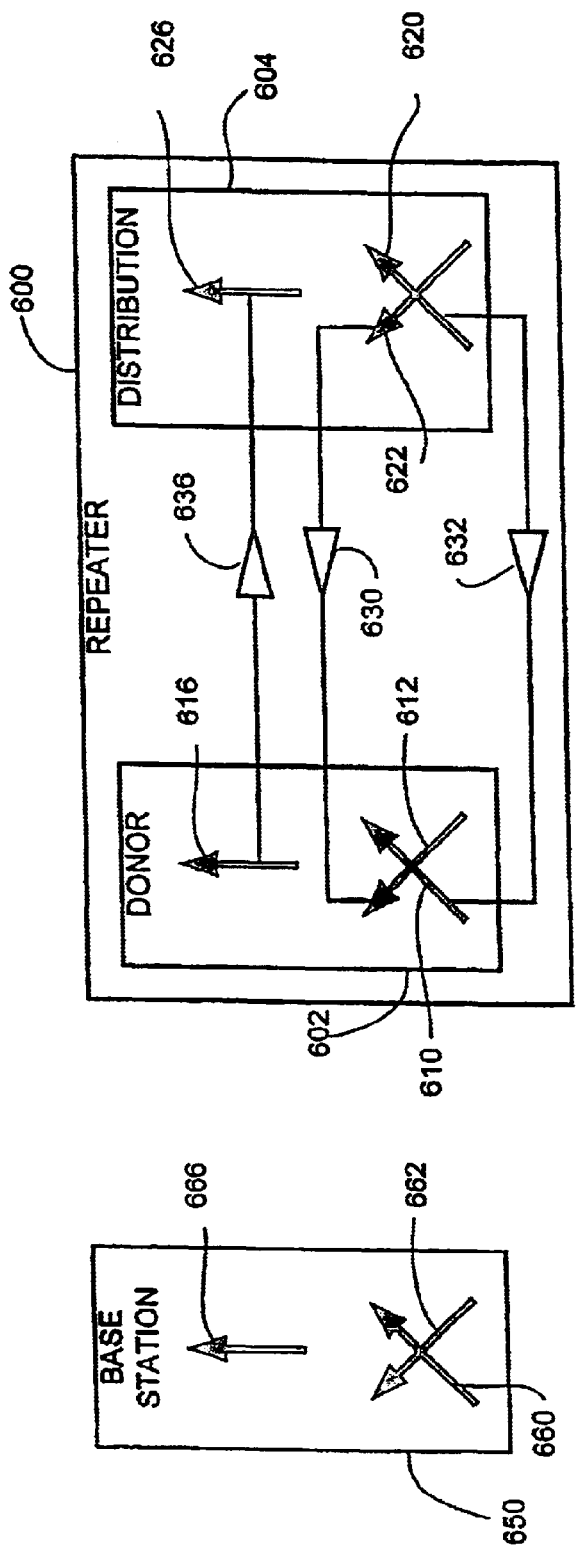
FIG. 12 is a schematic illustration of a repeater, constructed and operative in accordance with another preferred embodiment of the present invention.

Reference is now made to FIG. 12, which is a schematic illustration of a repeater, generally referenced 600, constructed and operative in accordance with another preferred embodiment of the present invention.

Repeater 600 is a polarization diversity repeater and includes a donor section 602, which links to a base station and a distribution section 604, which links with mobile units and the like.

The donor section 602 includes a receive element 616 and two orthogonally polarized transmit elements 610 and 612. The distribution section 604 includes a transmit element 626 and two orthogonal receive elements 620 and 622.

Elements 610, 612 and 616 are respectively connected to elements 620, 622 and 626 by amplifiers 630, 632 and 636, respectively. The amplifiers 630, 632 and 636 amplify signals received at the respective receiving elements 620, 622 and 616 before transmitting them via the respective transmitting elements 610, 612 and 626. Elements 610, 612, 616, 620, 622 and 626 are basically antennas, which are polarized.

The repeater 600 provides a transmit path from antenna 616 to antenna 626, which is designed to further transmit a vertically polarized signal provided by antenna 666.

The repeater 600 further provides a receive path from antennas 622 and 620 to antennas 612 and 610, which is designed to further transmit a randomly polarized signal provided a mobile unit, to antennas 662 and 620, at the base station 650.

The polarization diversity repeater 600 provides two links transmission of two orthogonal component of the waves received from the mobile terminals (not shown) via receive elements 620 and 622, to the polarization diversity antennas 660 and 662 at the base station 650 in a transparent way. This allows the base station 650 to exercise polarization diversity selection or combining of the signals arriving from the mobile terminals.

The polarization of the antennas in the repeater, that transmit these signals to the base station (the donor side) may not match the polarization of the base station antennas. However, the fading of the wave components in each orthogonal polarization have only little correlation between them. This degree of de-correlation, essential for effective diversity, is nevertheless preserved as long as both repeater antennas and base station antennas are orthogonal pairs.

The polarization diversity repeater 600 incorporates three amplifying channels: one for the transmission from the donor to the distribution, and two for the transmission from the distribution side to the donor. The Donor side receives the signals from the donor by antenna 616. This is amplified by amplifier 636 and retransmitted at the distribution side by antenna 626 with proper radiation coverage. The preferred configuration for these antennas is vertical polarization.

The signals received from the mobile terminals at the distribution side of the repeater by the two orthogonally polarized antennas 620 and 622. These are amplified by amplifiers 630 and 632 and re-transmitted by the two orthogonally polarized antennas 610 and 612, respectively, at the donor side to the base station 650 (the donor).

In accordance with a further aspect of the invention there is provided a repeater which provides varying polarization as well as polarization matching.

Polarization matching on the forward link (transmission from the base station) is an effective technique for enhancing this link. It requires the transmission by two orthogonlally polarized antennas at the base station, properly weighted to align the polarization of the outgoing wave with that of the incoming wave. In order for a repeater to relay the polarization matching it has to incorporate two transmit and two receive antennas on both the donor and the distribution sides, with respective amplifiers between them.

Figure 13:
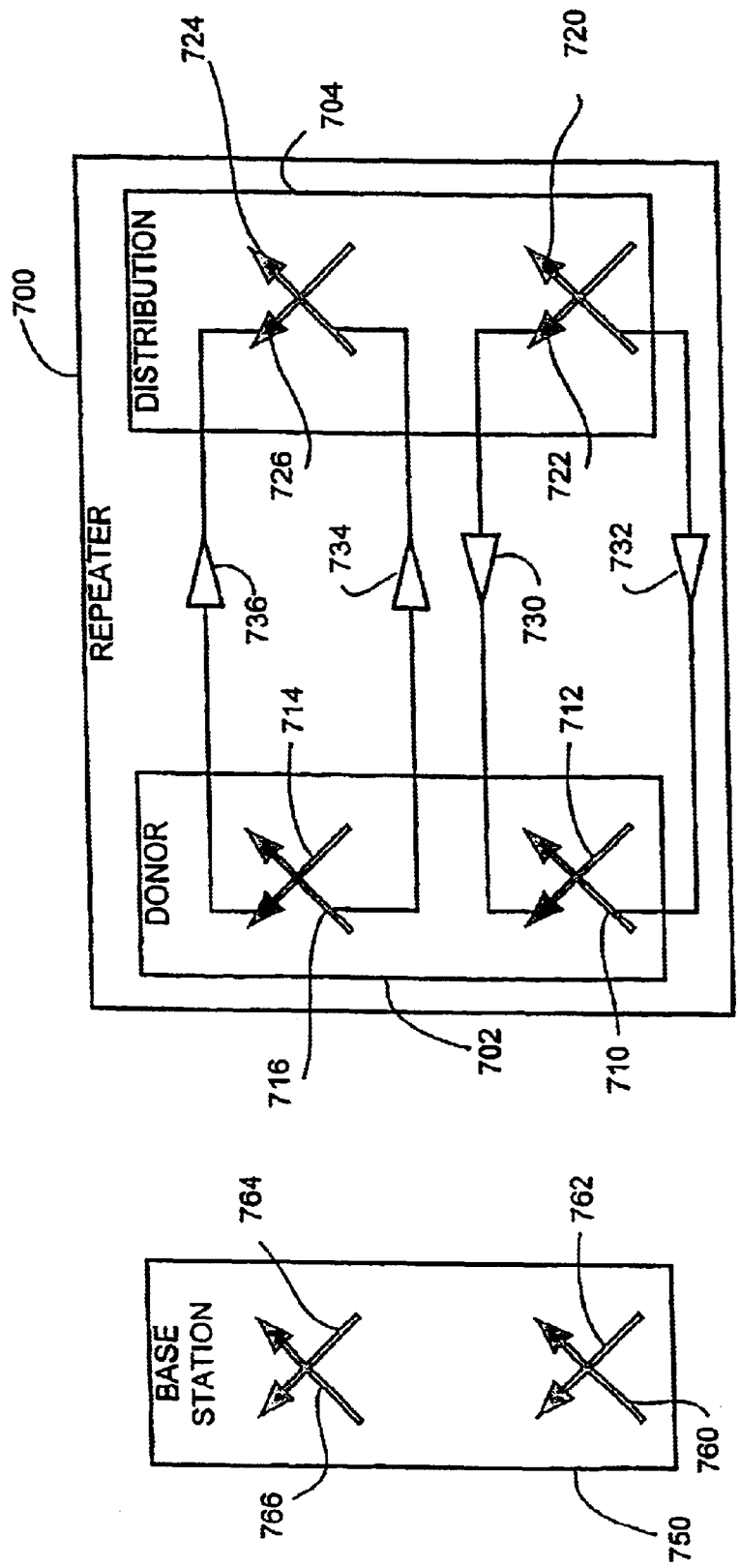
FIG. 13 is a schematic illustration of a repeater, constructed and operative in accordance with another preferred embodiment of the present invention.

Reference is now made to FIG. 13 which is a schematic illustration of a repeater, generally referenced 700 constructed and operative in accordance with another preferred embodiment of the present invention.

Repeater 700 is a polarization diversity repeater and includes a donor section 702, which links to a base station and a distribution section 704, which links with mobile units and the like.

The donor section 702 includes two orthogonally polarized receive antennas 714 and 716 and two orthogonally polarized transmit antennas 710 and 712. The distribution section 704 includes two orthogonally polarized transmit antennas 724 and 726 and two orthogonal receive antennas 720 and 722.

Antennas 710, 712, 714 and 716 are respectively connected to antennas 720, 722, 724 and 726 by an amplifiers 730, 732, 734 and 736, respectively. The amplifiers 730, 732, 734 and 736 amplify signals received at the respective receiving antennas 720, 722, 714 and 716 before transmitting them via the respective transmitting antennas 710, 712, 724 and 726.

The repeater 700 provides a transmit path from antennas 714 and 716 to antenna 726, which is designed to further transmit a polarized signal, in any direction, provided by antennas 764 and 766.

The repeater 700 further provides a receive path from antennas 722 and 720 to antennas 712 and 710, which is designed to further transmit a randomly polarized signal provided by a mobile unit, to antennas 762 and 760, at the base station 750.

It is to be noted, that in order for the repeater 700 to relay the correct polarization vector back to the mobile terminal, the polarization transfer between the antenna pair 714 and 716 should be identical to the polarization transfer between antennas 724 and 726.

In accordance with a further aspect of the invention, there is provided a space diversity repeater, which overcomes the disadvantages of the prior art.

Figure 14:
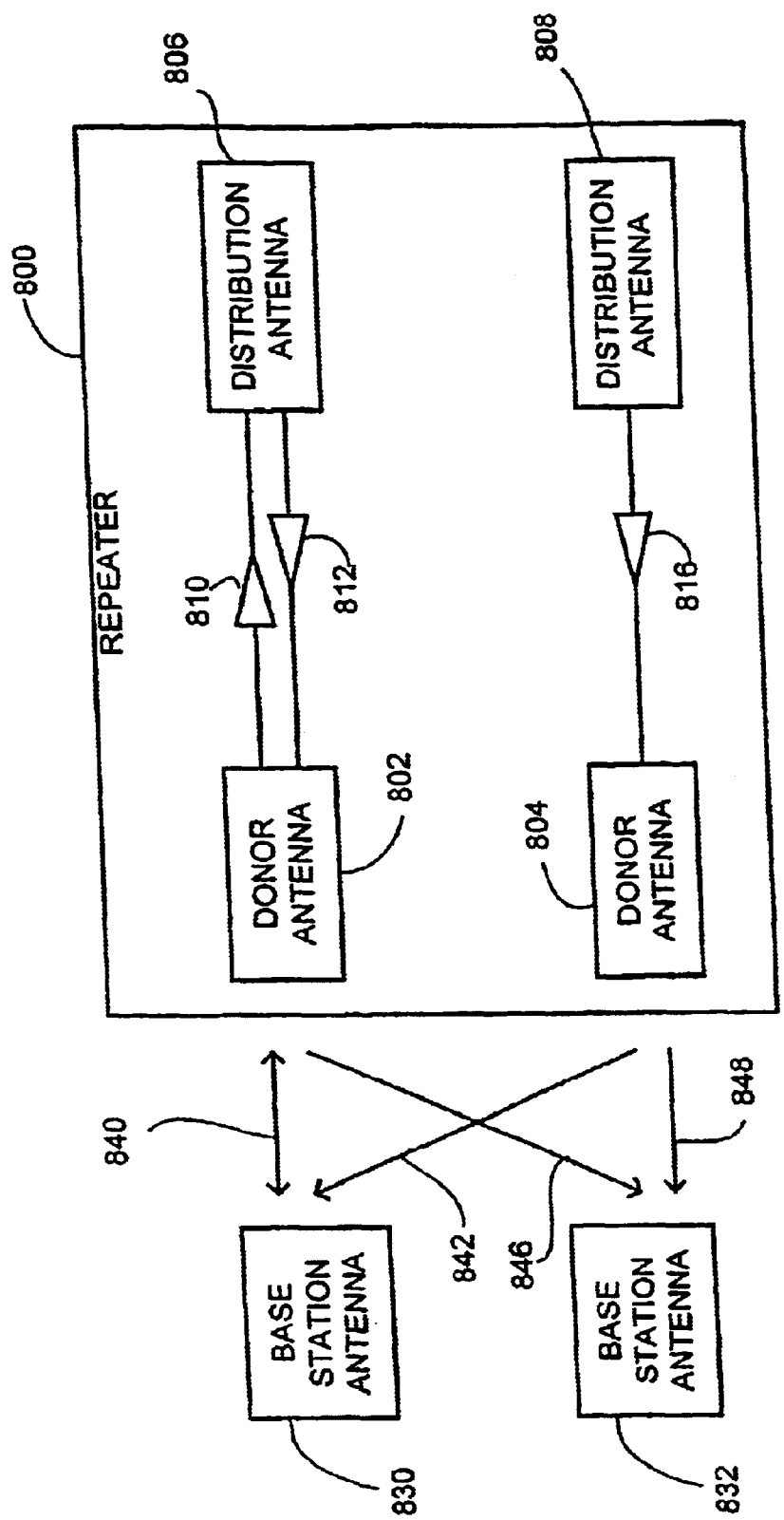
FIG. 14 is a schematic illustration of a space diversity repeater, constructed and operative in accordance with another preferred embodiment of the present invention.

Reference is now made to FIG. 14, which is a schematic illustration of a space diversity repeater, generally referenced 800, constructed and operative in accordance with another preferred embodiment of the present invention.

Device 800 includes two donor transceivers 802 and 804, two subscriber transceivers 806 and 808 and four amplifiers 810. 812, 814 and 816. It will be noted that each of the transceivers can include a receive antenna and a transmit antenna. In the present example, each of the transceivers includes a single antenna, controlled by a diplexer.

Amplifiers 810 and 812 are connected between transceivers 802 and 806. Amplifiers 814and 816 are connected between transceivers 804 and 808. The repeater 800 relays two base stations 830 and 832, to a plurality of mobile stations (not shown), simultaneously.

On the distribution side, the repeater diversity antennas are to be space in accordance with the angular span of the waves arriving from the mobile terminals. When positioned in this way, the fading of the signals received by antennas 806 and 808 are decorrelated. The channels from the repeater to the base station are stationary, however, and each of the base station antennas receives the signals from both antennas 802 and 804. Decorrelation of signals arriving at the base station are achieved by isolating the channel between antennas 802 and 830 from that between antennas 804 and 832 or by varying in time the radiation from either antenna 802, or 804, or both. This is achieved by varying in time the radiation phase of antenna 802 or 804, by a time-variable phase shifter, or otherwise varying the radiation pattern of antenna 804 in time.

Transceivers 802 and 804 incorporates either two separate antennas for transmit and for receive, or a diplexer and one antenna. Transceiver 804 incorporates a single antenna, and a variable phase shifter or a variable attenuator, connected to the amplifier. Transceiver 808 incorporates a single antenna It will be noted that the mode of communications between the repeater and the base station is not dependent on the mode of diversity between the repeater and the mobile station, as long as the rules of decorrelating the channels between the repeater and the base station and between the repeater and the mobile terminal—are maintained. Thus, polarization diversity can be exercised between the repeater and the mobile while the communications to the base station is via the base station space diversity.

Figure 16:
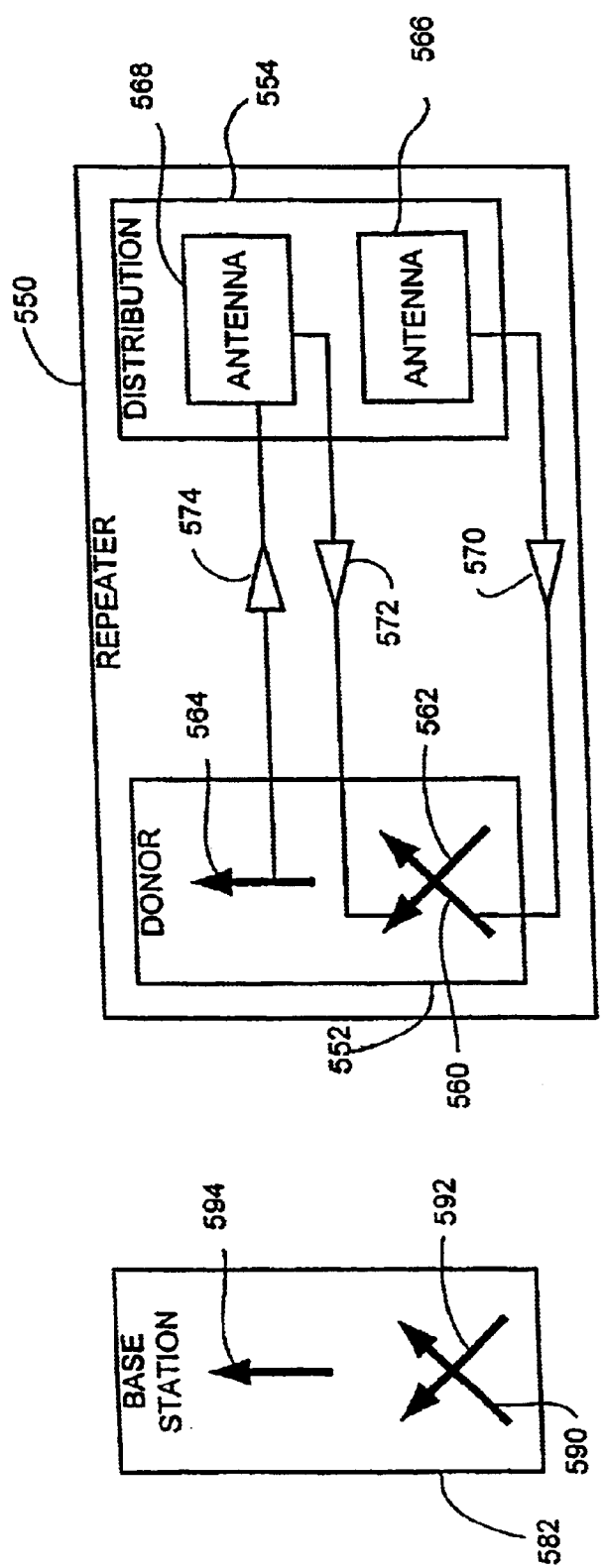
FIG. 16 is a schematic illustration of a mixed space-polarization diversity repeater, constructed and operative in accordance with a further preferred embodiment of the present invention.

Reference is now made to FIG. 16, which is a schematic illustration of a mixed space-polarization diversity repeater, generally referenced 550, constructed and operative in accordance with another preferred embodiment of the present invention.

Repeater 550 includes a donor section 552 and a subscriber section 554. The donor section 552 is constructed as a polarization diversity transceiver. The subscriber section 554 is constructed as a space diversity transceiver.

The donor section 552 includes vertically polarized antenna 564, wirelessly linked to a vertically polarized antenna 594, of a base station 582 and two orthogonally polarized antennas 560 and 564, wirelessly linked to two orthogonally polarized antennas 590 and 592, of base station 582.

The subscriber section 554 includes two spaced apart antennas 566 and 568. Repeater 550 further includes three amplifiers 570, 272 and 574. Amplifier 570 is connected between antennas 560 and 566, providing amplification of signals received by antenna 566, prior to transmitting via antenna 560.

Amplifier 572 is connected between antennas 562 and 568, providing amplification of signals received by antenna 568, prior to transmitting via antenna 562.

Amplifier 574 is connected between antennas 564 and 568, providing amplification of signals received by antenna 564, prior to transmitting via antenna 568.

Accordingly, repeater 550 provides non-correlated communication of one kind on the subscriber section 554 side and non-correlated communication of another kind, on the donor section 556 side.

Figure 17:
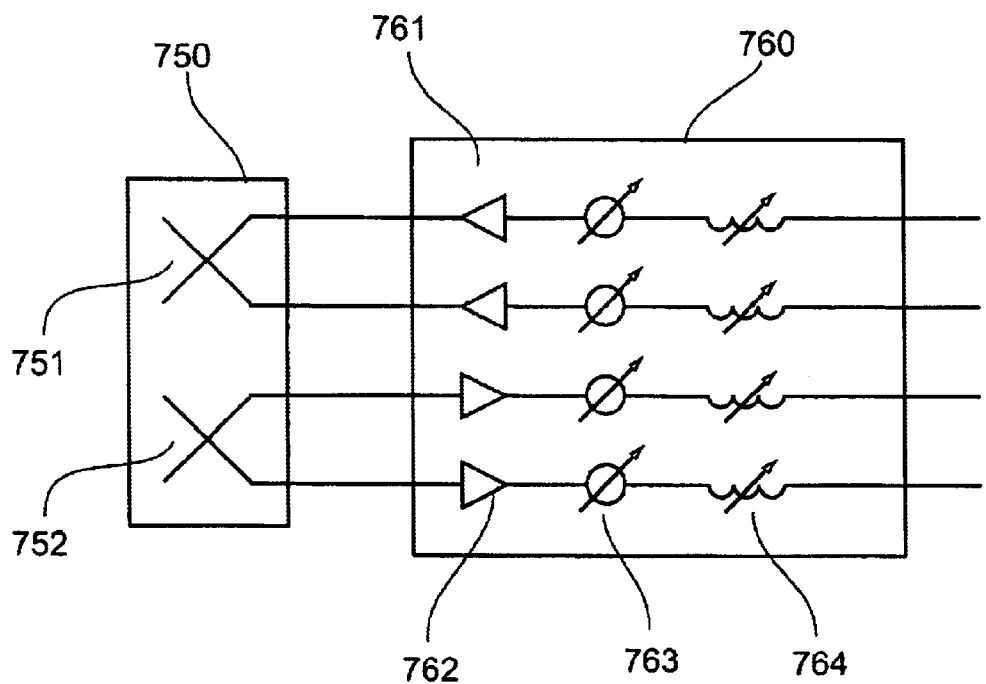
FIG. 17 is a schematic illustration of an orthogonal polarization antenna module for transmit and receive, and an active radiator module.

Reference is now made to FIG. 17 which shows an orthogonal polarization antenna for transmit and receive 750 and an active radiator module 760. The orthogonal polarization antenna comprises a pair of orthogonal polarization antennas 751 for transmit and a similar pair 752 for receive. Active radiator module 760 comprises power amplifier 761 and low noise amplifier 762, phase control 763 and amplitude control 764.

Figure 18:
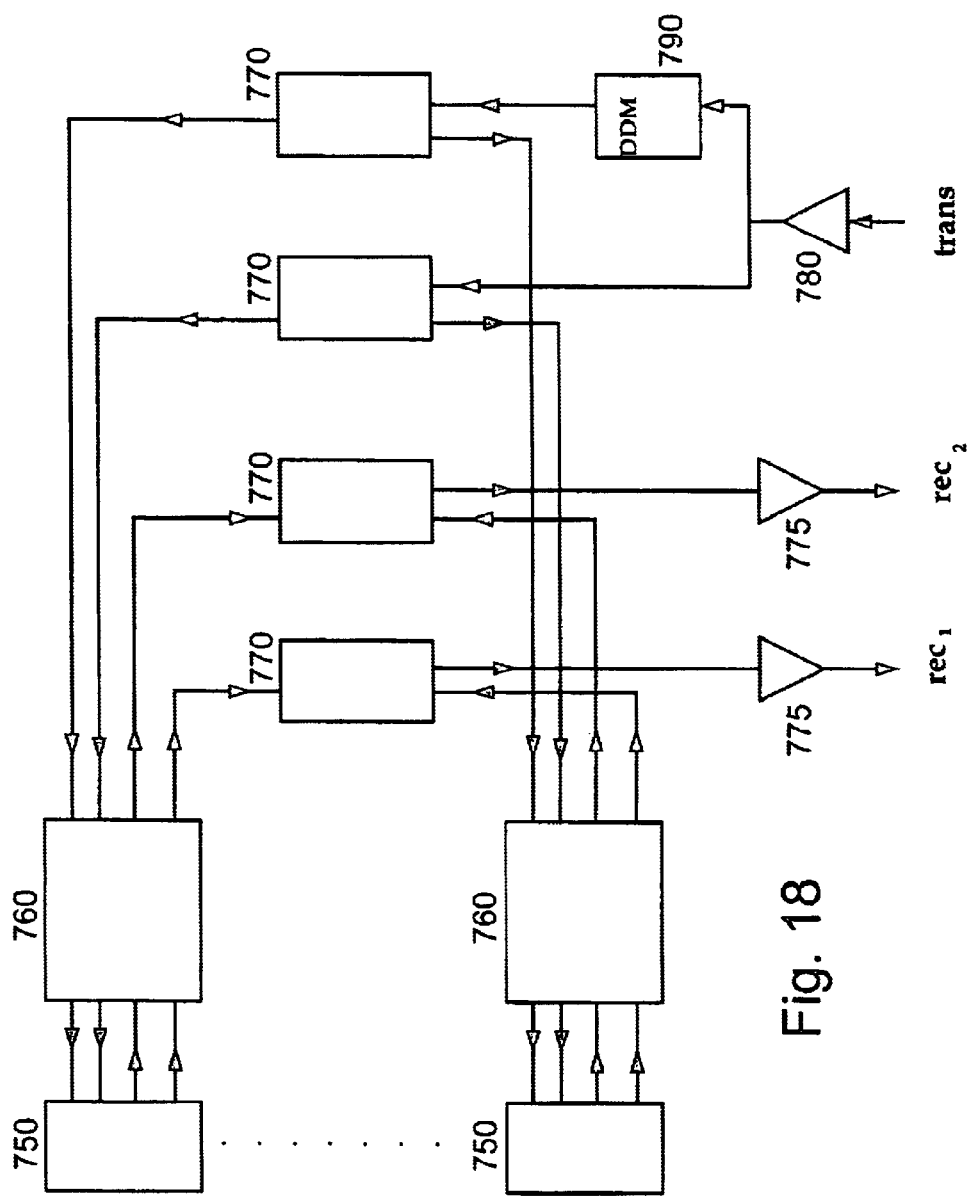
FIG. 18 is a schematic illustration of an orthogonal polarization antenna module with a plurality of active antenna modules.

Reference if now made to FIG. 18, which is a simplified schematic diagram illustrating an orthogonal polarization antenna module with a plurality of active antenna modules. The orthogonal polarization antenna for transmit and receive 750 is connected to active radiator module 760. Active radiator module 760 is in turn connected to beam forming networks 770, low power amplifier 780 and delay diversity module 790.

Figure 19:
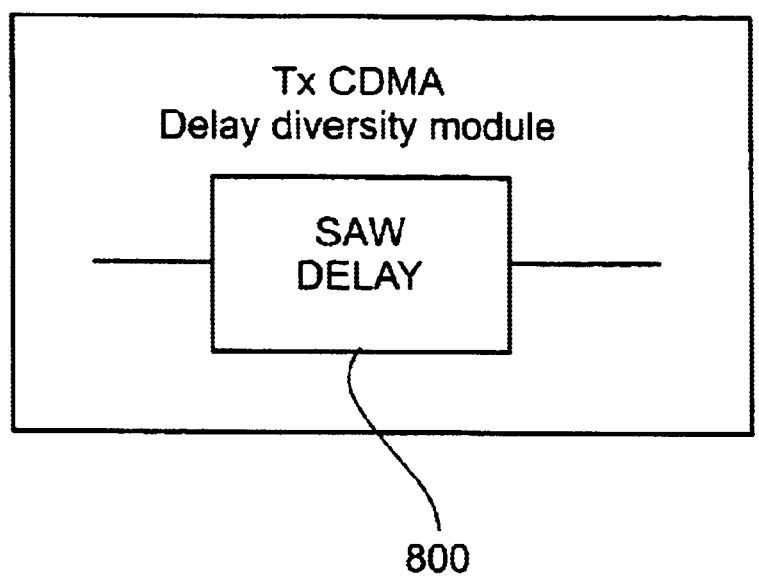
FIG. 19 is a schematic illustration of a delay diversity module with a SAW delay unit therein.

Reference is now made to FIG. 19, which is a simplified diagram illustrating a delay diversity module comprising a SAW delay 800.

It will be appreciated by persons skilled in the art that the present invention is not limited to what has been particularly shown and described hereinabove. Rather the scope of the present invention is defined by the claims which follow.

What is claimed is:

1. A modular cellular wireless communication base station comprising:

a plurality of pairs of respectively orthogonal polarization antennas, each pair having a respective location, a plurality of active radiator modules located each at one of said respective antenna pair locations, each module associated with antenna pair corresponding to said location, for each antenna a transmitter comprising a power amplifier, and a receiver;

for each module a beam-forming network controlling relative amplitudes and phases of each of said modules;

an RF front end for transmitting over a low power link with said plurality of active radiator modules via said beam forming network and for receiving over a lower power link via a low noise amplifier;

and a delay diversity module, located to operate on a low power signal prior to amplification by a respective one of said power amplifiers, that provides a transmission CDMA delay diversity.

2. A modular cellular wireless communication base station according to claim 1 and wherein said delay diversity module comprises:

a SAW delay line, and an amplifier that compensates for a delay line insertion loss.

3. A modular cellular wireless communication base station according to claim 1 and wherein said delay diversity module is connected at a transmission beam forming network input.

4. A modular cellular wireless communication base station according to claim 1 and wherein said delay diversity module is connected at an active antenna transmission input.

\* \* \* \* \*